United States Patent [19]
Kendrick

[11] Patent Number: 5,085,250
[45] Date of Patent: Feb. 4, 1992

[54] ORIFICE SYSTEM

[75] Inventor: Ray Kendrick, Katy, Tex.

[73] Assignee: Daniel Industries, Inc., Houston, Tex.

[21] Appl. No.: 629,130

[22] Filed: Dec. 18, 1990

[51] Int. Cl.$^5$ ............................................. F15D 1/02
[52] U.S. Cl. ........................................ 138/44; 138/40; 277/180; 277/215; 277/235 R
[58] Field of Search ............... 138/40, 44, 94, 94.3; 277/181, 180, 215, 136, 207 A, 238 R; 239/590.3

[56] References Cited

U.S. PATENT DOCUMENTS

| | | | |
|---|---|---|---|
| 652,177 | 6/1900 | Gabel | 239/590.3 |
| 1,892,906 | 1/1933 | Schnitter | 138/44 |
| 1,938,460 | 1/1933 | Muff | 138/44 |
| 2,687,748 | 9/1954 | Whalen | 138/44 |
| 3,176,723 | 4/1965 | Hodgeman | 138/44 |
| 3,209,770 | 10/1965 | McGowen | 138/44 |
| 3,273,805 | 9/1966 | Hall | 239/590.3 |
| 3,986,721 | 10/1976 | Decker | 277/180 |
| 4,593,915 | 6/1986 | Seger | 138/44 |
| 4,633,911 | 1/1987 | Lohn | 138/44 |

Primary Examiner—Harvey C. Hornsby
Assistant Examiner—Terrance R. Till
Attorney, Agent, or Firm—David M. Ostfeld

[57] ABSTRACT

An orifice installation for centering the orifice aperture within a plate carrying device is disclosed. The orifice installation uses an orifice plate in cooperation with a seal that surrounds the outer edge of the orifice plate to seal the plate to a fitting. Reliefs are formed in the non-sealing portion of the surface of the seal through which the orifice plate outer circumference protrudes. The carrying device is provided to receive the plate and the seal. A mechanism is provided to have contact between the carrying device and the protrusions in order to use the manufacturing tolerances of the plate and the carrying device to center the plate in the carrying device.

23 Claims, 5 Drawing Sheets

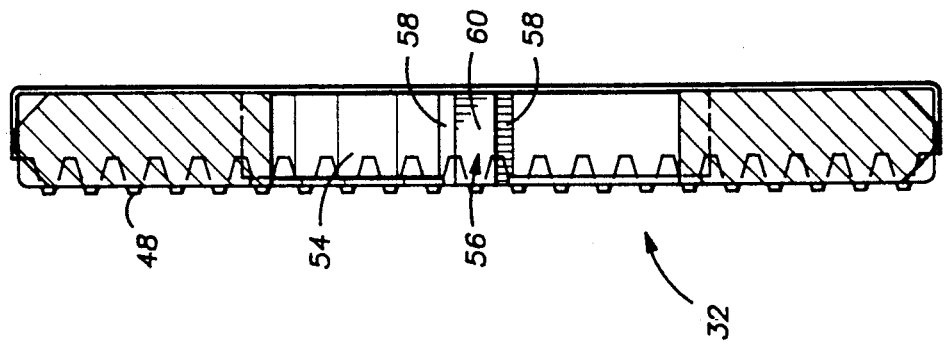
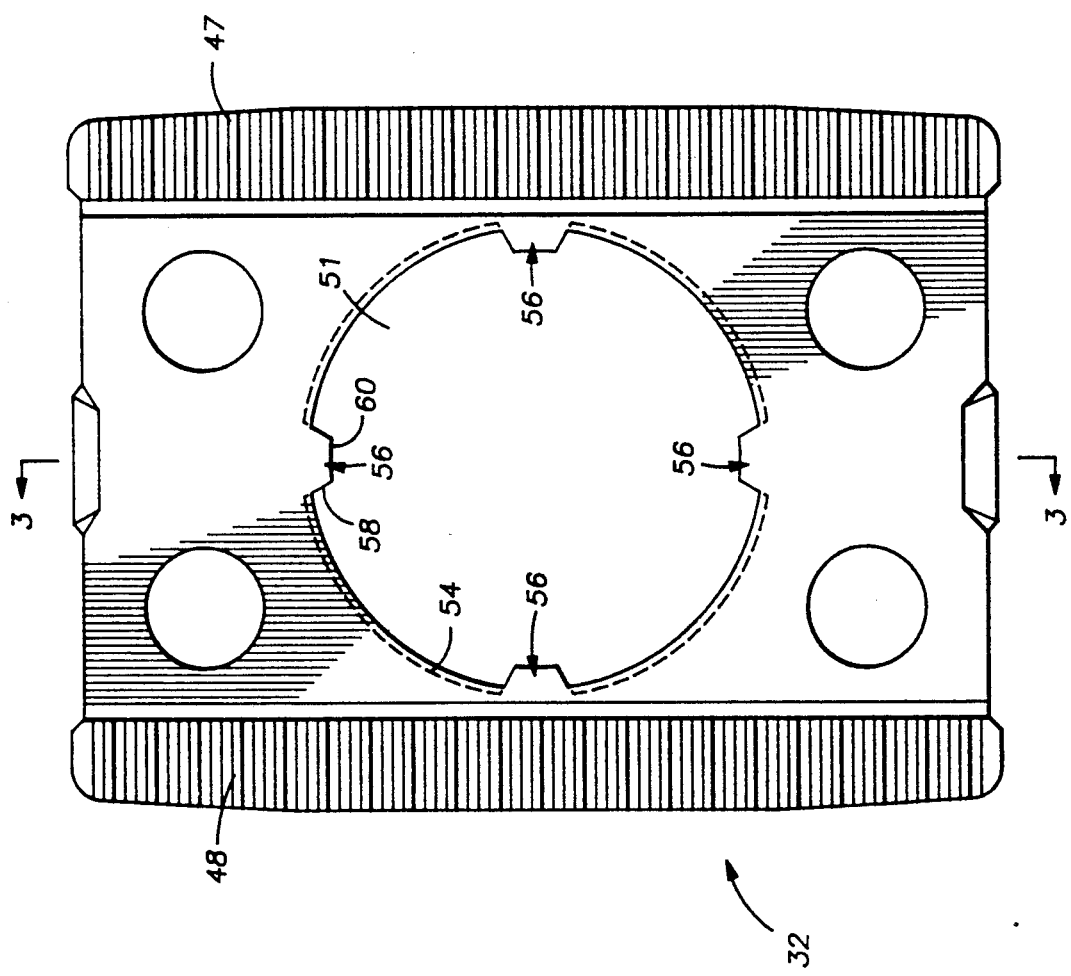

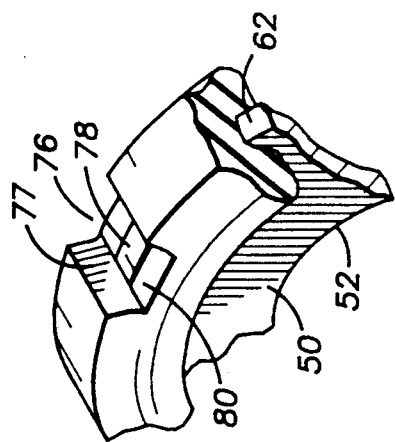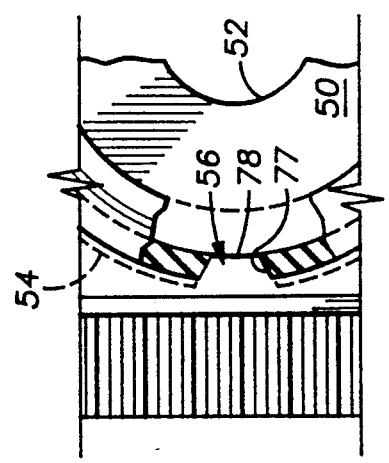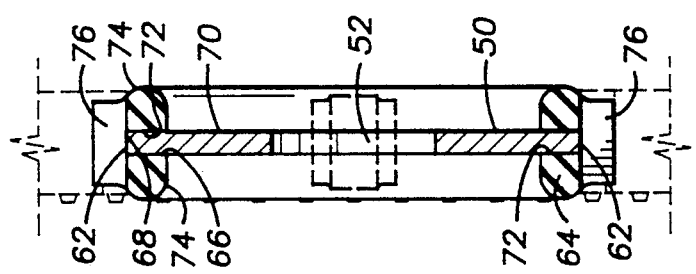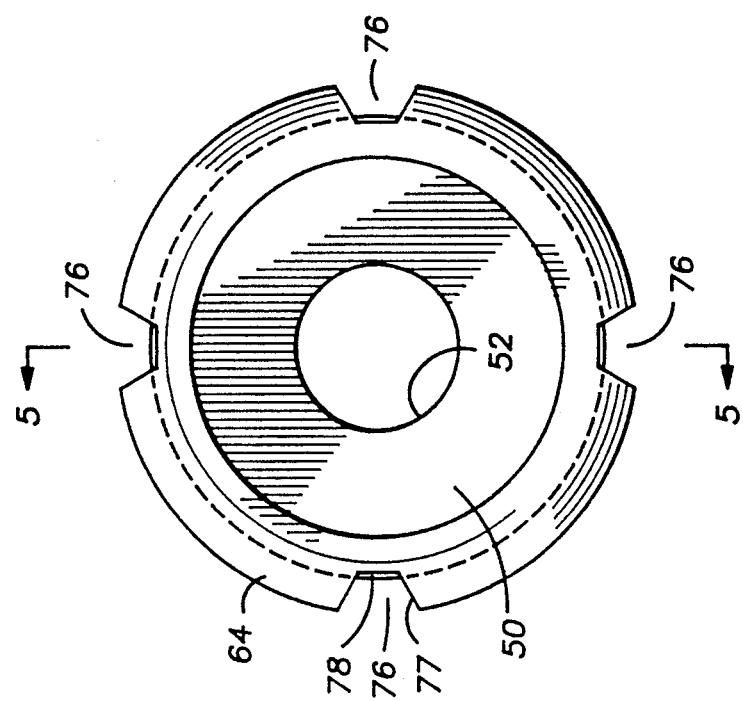

ORIFICE SYSTEM

FIELD OF THE INVENTION

The invention relates to flow measurement devices, and in particular, to flow measurement devices using orifice plates and differential pressure as a basis of the flow measurement.

BACKGROUND OF THE INVENTION

Pipelines are used to transport fluids such as the production fluids from oil and gas wells. Because the measurement of these fluids is important, orifice plates are installed in special fittings which are installed in-line with pipeline sections. Some fittings may permit an orifice plate to be moved in and out of the flow stream without interruption of the flow through the pipeline. Other fittings permit orifice plates to be moved in and out of the pipeline only by interruption of flow.

The use of orifice measurement for flow has been known since ancient times. The basis of orifice measurement is to place a plate in a flow line, with the plate having an opening which is smaller than the opening of the flow line. By reading the upstream and downstream pressure on either side of the plate, and calculating the difference of pressure between the upstream and downstream pressures, one can infer the rate of flow in the pipe line.

The accuracy of the measurement given by the orifice is dependent on many factors, including the ratio of the orifice hole to the diameter of the pipe, the length of straight run of the upstream and downstream pipe or tube sections on either side of the orifice, the eccentricity of the orifice hole in the pipe or tube and the like. The standards to assure accuracy have been governed by ANSI Standard ANSI/API 2530, which are wholly adequate for flow measurement.

Nevertheless, there has been a series of meetings to significantly revise API/AGA standards, which would constitute a revision to Manual of Petroleum Measurement Standards, Chapter 14, "Natural Gas Fluids Measurement", which includes Section 3, "Concentric, Square-edged Orifice Meters". The revised Section 3 may become an update and would then become a revision to ANSI Standard ANSI/API 2530; i.e.: AGA Report No. 3.

These new requirements probably will be adopted by some companies even though additional costs will be attendant with mechanical changes associated with the requirements. The new requirements require greater control on centering (concentricity or eccentricity) of orifice plates as installed in any holding device. However, most orifice plate holding devices other than flanges require some manner of plate/seal/carrying device combination. The most common seal of this type is an elastomeric seal which is assembled around the orifice plate. This type of seal may not yield the greater control of centering required by the new revisions with respect to installed assemblies. This is due to molding tolerances.

There is, therefore, needed an orifice plate and seal combination that permits greater control of concentricity at installation while still permitting the current common sealing aspects presently in use.

SUMMARY OF THE INVENTION

The present invention discloses an orifice plate which can be installed with great control on concentricity while allow sealing features of a molded rubber or other elastomeric or plastic or metal seal. Reliefs are provided at points around the circumference of the seal which allow the orifice plate outer edge to protrude into the reliefs. A plate carrying device with matching protrusions to the reliefs can therefore closely contact the orifice plate exposed edges, allowing very close metal-to-metal containment of the entire assembly, thereby providing the necessary concentricity control. However, the elastomeric or plastic seal at the points of relief are not affected by the relief; these services are still available to provide their normal sealing functions. Other sealing devices can be similarly designed to allow these multi-point orifice plate protrusion contact points, thus making this carrier/seal/plate assembly universal for multiple uses.

BRIEF DESCRIPTION OF THE DRAWINGS

For a further understanding of the nature and objects of the present invention, reference is made to the following drawings in which like parts are given like reference numbers and wherein:

FIG. 2 is a front view of the preferred embodiment of the present invention of a plate carrying device for use within an orifice fitting;

FIG. 3 is a cross-sectional view of the embodiment of the present invention taken along section lines 3—3 of FIG. 2;

FIG. 4 is a front view of the orifice plate and seal of the preferred embodiment of the present invention;

FIG. 5 is a cross-sectional view of the embodiment of the present invention taken along section lines 5—5 of FIG. 4;

FIG. 6 illustrates a detail of the orifice plate and seal of the preferred embodiment of the present invention;

FIG. 7 illustrates a detail of the orifice plate and seal interfaced with a plate carrying device of the preferred embodiment of the present invention;

DESCRIPTION OF THE EMBODIMENTS

Figure 1:
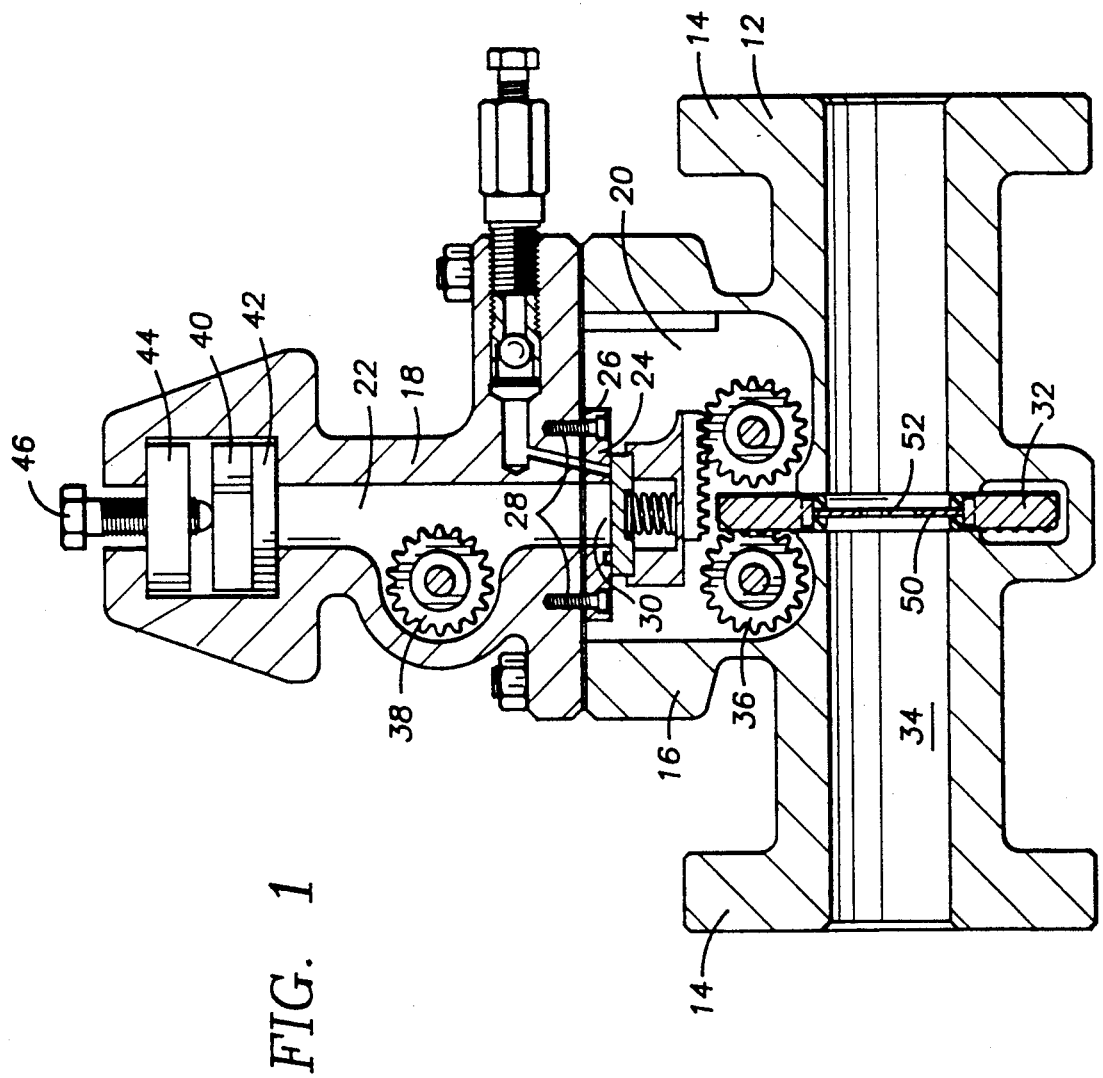
FIG. 1 illustrates a sectional elevation view of the preferred embodiment of the present invention in an orifice fitting.

The present invention discloses an orifice plate and method for centralizing the orifice plate in a fitting connected to a pipeline. FIG. 1 illustrates an orifice fitting 12. As illustrated, orifice fitting 12 includes flanges 14 which are used to bolt fitting 12 to sections of the pipeline (not shown). Alternately, the orifice fitting 12 may include weld bevels (not shown) and may be welded directly into the pipeline, or a combination of a flange and a weld bevel may be used to place the fitting into the pipeline.

Orifice fitting 12 also includes body 16 and top 18. Body 16 encloses lower chamber 20 which is in fluid communication with fluid 34 from the interior of the pipeline, and top 18 encloses upper chamber 22. Valve seat 24 and valve seat gasket 26 are connected to top 18 with valve seat screws 28. Aperture 30 defines an opening through valve seat 24 and valve seat gasket 26 which permits the communication of fluids therethrough.

Valve seat 24 is illustrated as a generally rectangular plate having a lower base or surface which substantially constitutes a flat plane surface. Valve seat 24 can be constructed from alloy iron or other material. Valve seat gasket 26 can be constructed from a gasket material, such as graphite asbestos, and valve seat screws 28 can be constructed from a chemically treated steel or alloy.

As illustrated in FIG. 1, orifice plate carrying device 32 is located in communication with pipeline fluid 34. Orifice plate carrying device 32 can be raised and lowered within orifice fitting 12 by operating lower drive 36, comprising a gear shaft and pinions, and upper drive 38, also comprising a gear shaft and pinions.

Upper chamber 22 is sealed from the ambient environment with sealing bar 40 and sealing bar gasket 42 which are retained with clamping bar 44 and clamping bar screws 46.

As illustrated in FIG. 2, orifice plate carrying device 32 comprises parallel racks 47, 48, adapted to interface with lower drive 36 and upper drive 38. An orifice plate 50 which normally has a center hole 52 as best seen in FIGS. 4, 5, 7, 8, 9 and 10 is located interior to racks 47, 48. Orifice plate carrying device 32 has an opening 51 to receive orifice plate 50 therein.

Orifice plate carrier 32 has an inner circumference 54 for opening 51 which is generally circular in shape but includes ears or protrusions 56 projecting into opening 51. Ears 56 may be generally trapezoidal in shape, having sloping sides 58 and interior surface 60.

Figure 8:
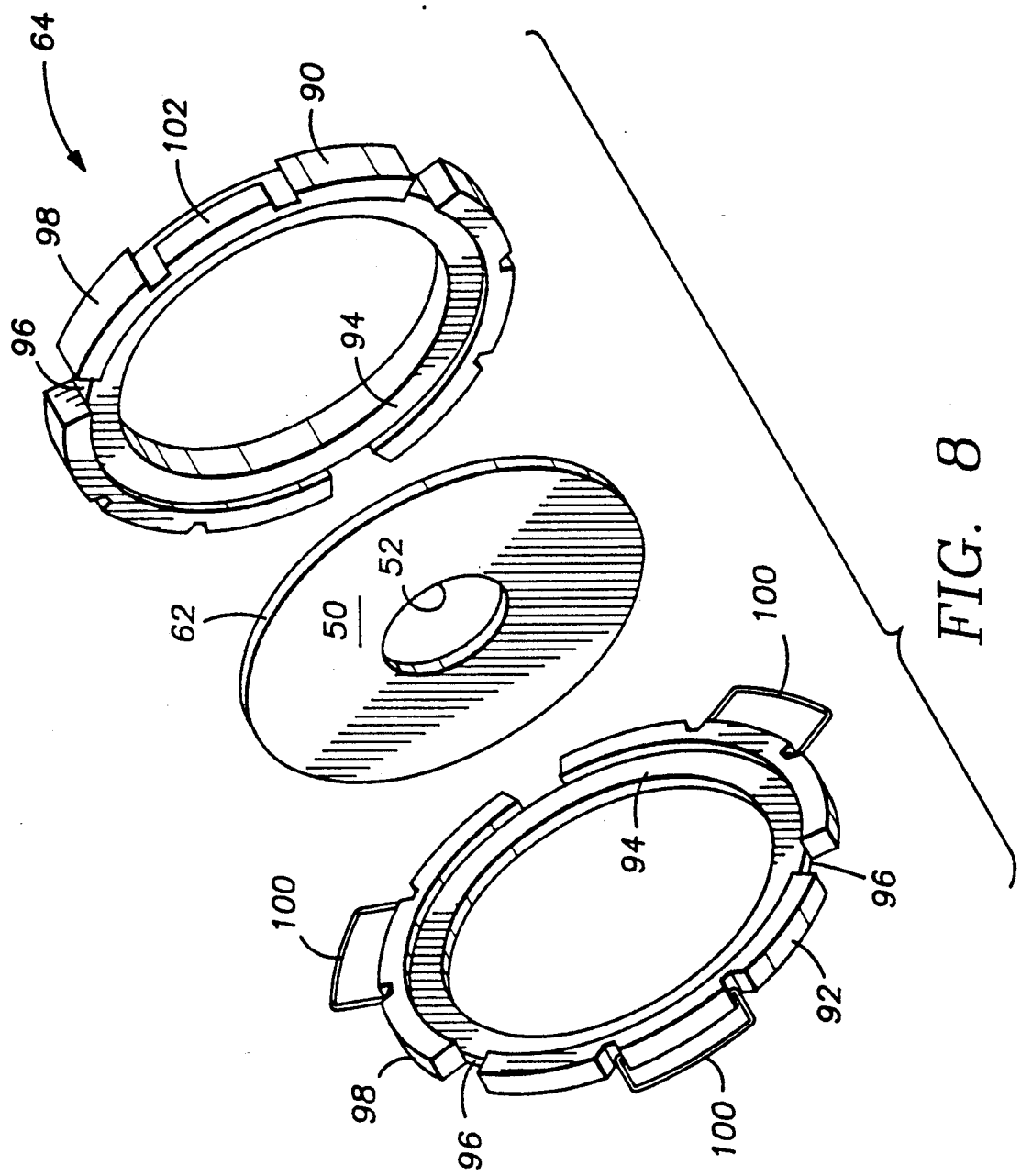
FIG. 8 illustrates an exploded view of an orifice plate and an alternate seal of the present invention.

As best seen in FIG. 8, orifice plate 50 is generally circular in shape having outer circumference 62. This is a "universal" plate standard, however the invention may be used with any plate. For example, plate 50 may have extensions which are non-universal, to fit in grooves of a plate holder.

In the preferred embodiment of the present invention and in the alternate embodiments, orifice plate 50 is preferably made of metal and orifice plate carrying device 32 is also preferably made of metal, including ears or protrusions 56.

As best seen in FIGS. 4 and 5, orifice plate 50 is normally surrounded by an elastomeric gasket 64, such as rubber. Rubber gasket 64 includes slit 66 in the interior of rubber gasket 64, shaped and sized to receive circumference 62 within slit 66, such that outer circumference 62 abuts inner circumference 68 of seal 64. The sides 70 of plate 50 are circumscribed at their extreme outer surfaces immediately adjacent to circumference 62 by interior sides 72 of seal 64. Seal 64 is shaped such that its two exterior side or face surfaces 74 form a seal with the interior surfaces of fitting 12. Grooves or reliefs 76 having sides 77 are formed by molding or cutting in the exterior of seal 64 to expose a portion or tips 78 of the outer circumference 62 of orifice plate 50. Such sides 77 may be slanted. See FIG. 6. The grooves or reliefs 76 correspond in shape and dimension and number and spacing to match ears or protrusions 56. The tips 78 which protrude through the bottoms 80 of seal 64 abut the end 60 of inner circumference 54 ears or protrusions 56. The orifice plate 50 and seal 64 mounted on it are sized to fit snugly within opening 51 such that tips 78 abut ends 60 of ears 56, thereby permitting accurate centering of orifice plate 50, and accordingly hole 52, within the orifice plate carrying device 32.

In the preferred embodiment, the sealing device 64 may be any elastomeric material, such as rubber. Such elastomeric material may be vulcanized onto orifice plate 50 or may be form-fitted around orifice plate 50 as is appropriate depending on size. Alternately, as shown in FIG. 8, there are some sealing materials that do not vulcanize well and do not have very good elastic properties, such as plastics, for example Teflon type materials, and metal.

In such situations as shown in FIG. 8, seal 64 may be formed of two parts 90, 92, each of which has an interior portion to receive orifice plate 50 therein. Each side would also have grooves or reliefs 96 cut into the exterior circumference 98 of each side through which the tips of circumference 62 would protrude to interface with ears or protrusions 56. Accordingly grooves or reliefs 96, like grooves or reliefs 76, would correspond not only with each other but would correspond in shape, dimension, number and spacing to match ears or protrusions 56. The sides 90, 92 would be coupled by, for example, clips 100 affixed to side 92 engaging extensions 102 on the circumference 98 of side 90.

Figure 10:
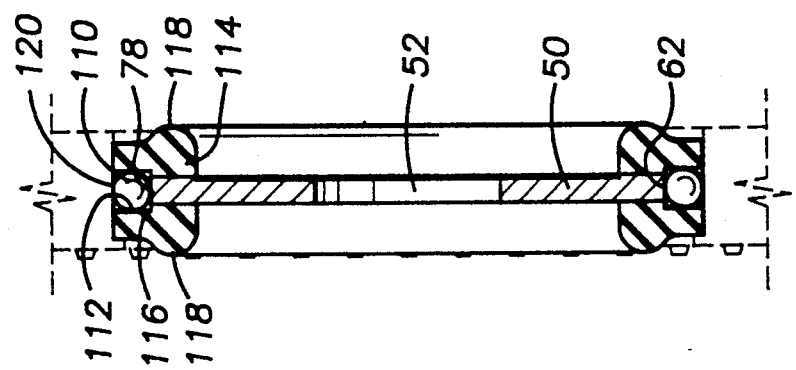
FIG. 10 is a side cross-sectional view of FIG. 9 taken along section lines 10—10 FIG. 9.
Figure 9:
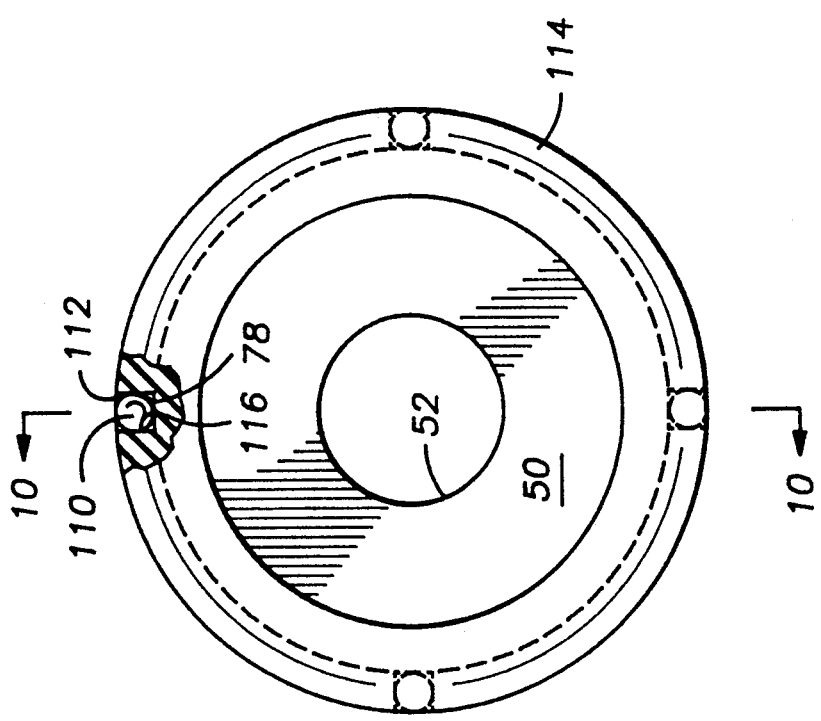
FIG. 9 is a front cross-sectional view of an orifice plate and an alternate seal with mounting bearings of the preferred embodiment of the present invention.

As another alternate, and as shown in FIGS. 9 and 10, tips 78 of orifice plate 50 may abut ball bearings 110 fitted into a hole or an alternate groove 112 of a seal 114. In such a circumstance grooves or holes 112 would have substantially vertical sides 116, instead of the slanted sides 77 of seal 64. Vertical sides 116 help hold ball bearings 110 in place. Seal 114 would have sealing sides 118 for forming a seal with the interior surfaces of fitting 12. Because ball bearings 110 may be made with very tight tolerances, the concentricity requirement of the orifice plate 50 would still be met. Further, in this case, the plate carrier 32 would not include ears 56 but would incorporate a close bored internal diameter 120 of such tolerance as to allow the ball bearing 110 to provide an intermediate metal interface between the plate outer circumference 62 and the plate carrier internal diameter 120.

The embodiments set forth herein are merely illustrative and do not limit the scope of the invention or the details therein. For example, the seals may be of a type shown in FIG. 8 but may be metal. Additionally, although the plate carrying device illustrated is used for a fitting that may be moved in and out of the flow stream without interruption of the flow through the pipeline, it can be used with any fitting including those that may be moved in and out of the pipeline only by interruption of flow. Also, ball bearings 110 could be any intermediate interface, including metal and plastic, between the plate carrier and the orifice plate, including a piece molded in the seal. Further, the number of grooves illustrated should not be considered limiting and more grooves could be used, for example with larger plate sizes. Also, for elastomers, the seal may be vulcanized or fitted onto the orifice plate. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be more in the embodiments herein detailed in accordance with the descriptive requirements of the law, it is to be understood that the details herein are to be interpreted as illustrative and not in a limiting sense.

What is claimed is:

1. An orifice system for use with an orifice plate carrier, comprising:
   an orifice plate having an outer circumference;
   seal means for engaging said outer circumference of said orifice plate said seal mean including outer sealing surface; and
   said seal means having outer circumferential end surface having reliefs therein to portions of said outer circumference of said orifice plate.

2. An orifice system as recited in claim 1, wherein said seal means is comprised of an elastomer. .

3. An orifice system as recited in claim 2, wherein said elastomer is volcanized onto said orifice plate.

4. An orifice system recited in claim 2, wherein said elastomer is fitted onto said orifice plate.

5. An orifice system recited in claim 1, wherein said seal means is comprised of a plastic, having two sides sized to receive said orifice plate and connecting said sides with said plate therebetween.

6. An orifice system recited in claim 1, wherein said reliefs include three grooves.

7. An orifice system as recited in claim 1, wherein said reliefs include four grooves.

8. An orifice system recited in claim 1, wherein said outer sealing surface is a face sealing surface.

9. An orifice plate holding system, comprising:
   an orifice plate having an outer circumference;
   a seal surrounding said outer circumference, said seal having at least one outer sealing surface and an outer nonsealing surface;
   said nonsealing surface having grooves therein of sufficient depth to permit portions of said outer circumference to protrude through said grooves;
   a plate carrying device having an interior opening sized to receive said orifice plate and said surrounding seal therein;
   first means for interacting with said protruding outer circumference to center said orifice plate in said opening.

10. The orifice plate holding system as recited in claim 9, wherein said outer sealing surface is a face sealing surface and said non-sealing surface is a circumferential surface.

11. An orifice plate holding system as recited in claim 9, wherein said first means is mounted on said plate carrying device and includes ears having ends, said ends abutting said protruding outer circumference.

12. An orifice plate holding system as recited in claim 11, wherein there are four ears.

13. An orifice plate holding system as recited in claim 11, wherein there are three ears.

14. An orifice plate holding system as recited in claim 9, wherein said interior opening abuts said outer sealing surface.

15. An orifice plate holding system as recited in claim 9, wherein said seal includes two parts which contain said orifice plate therebetween.

16. An orifice plate holding system as recited in claim 15, wherein said two parts sandwich said orifice plate therebetween.

17. An orifice plate holding system as recited in claim 15, wherein there are included means for connecting said two parts together.

18. An orifice plate holding system as recited in claim 15, wherein said parts are comprised of plastics.

19. An orifice plate holding system as recited in claim 15, wherein said parts are comprised of metal.

20. An orifice plate holding system as recited in claim 9, wherein said seal is comprised of elastomer.

21. An orifice plate holding system as recited in claim 20, wherein said seal is vulcanized rubber attached to said orifice plate.

22. An orifice plate holding system as recited in claim 20, wherein said seal is rubber in which said orifice plate is inserted.

23. An orifice installation for measuring flow in pipes in which fluids may flow, comprising:
   an orifice plate having an outer circumference;
   a seal surrounding said outer circumference;
   a plate carrying device having an interior opening sized to receive said orifice plate and said surrounding seal;
   a fitting for holding said plate, said seal having a sealing surface sealingly engaging said fitting and a nonsealing surface;
   said seal having grooves in said nonsealing surface exposing said outer circumference;
   means for close tolerance contacting of said plate carrying device with said exposed outer circumference to center said orifice plate in said plate carrying device.

* * * * *